(12) United States Patent
Akashi

(10) Patent No.: US 10,666,665 B2
(45) Date of Patent: May 26, 2020

(54) SECURITY CONFIRMATION APPARATUS, SYSTEM, INFORMATION PROCESSING METHOD, AND STORAGE MEDIUM

(71) Applicant: CANON KABUSHIKI KAISHA, Tokyo (JP)

(72) Inventor: Masamichi Akashi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 15/615,723

(22) Filed: Jun. 6, 2017

(65) Prior Publication Data

US 2017/0374087 A1 Dec. 28, 2017

(30) Foreign Application Priority Data

Jun. 24, 2016 (JP) ................. 2016-125798

(51) Int. Cl.
*H04L 29/06* (2006.01)

(52) U.S. Cl.
CPC .......... *H04L 63/1416* (2013.01); *H04L 63/08* (2013.01); *H04L 63/1408* (2013.01); *H04L 63/1433* (2013.01); *H04L 63/02* (2013.01); *H04L 63/1441* (2013.01); *H04L 63/1458* (2013.01)

(58) Field of Classification Search
CPC ............. H04L 63/0263; H04L 63/0236; H04L 63/1416
See application file for complete search history.

(56) References Cited

U.S. PATENT DOCUMENTS

| | | | |
|---|---|---|---|
| 7,620,988 B1* | 11/2009 | Hernacki | H04L 63/0227 713/152 |
| 2002/0144156 A1* | 10/2002 | Copeland, III | H04L 43/026 726/22 |
| 2005/0076235 A1* | 4/2005 | Ormazabal | H04L 63/02 726/4 |
| 2005/0210126 A1* | 9/2005 | Friedman | H04L 63/02 709/220 |

FOREIGN PATENT DOCUMENTS

| | | |
|---|---|---|
| JP | 2005-25269 A | 1/2005 |
| JP | 2007-272396 A | 10/2007 |

* cited by examiner

*Primary Examiner* — Dao Q Ho
(74) *Attorney, Agent, or Firm* — Canon U.S.A., Inc. I.P. Division

(57) ABSTRACT

A confirmation apparatus includes a determination unit configured to determine whether an information processing apparatus that has transmitted a security confirmation instruction executes communication via a firewall, a setting unit configured to set predetermined ports as inspection targets in a first case where the determination unit determines that the information processing apparatus executes communication via the firewall, and set ports listed in a used port list received from the information processing apparatus as the inspection targets in a second case where the determination unit determines that the information processing apparatus executes communication without interposing the firewall, an inspection unit configured to inspect ports set as the inspection targets by the setting unit, and a notification unit configured to notify the information processing apparatus of an inspection result acquired by the inspection unit.

9 Claims, 7 Drawing Sheets

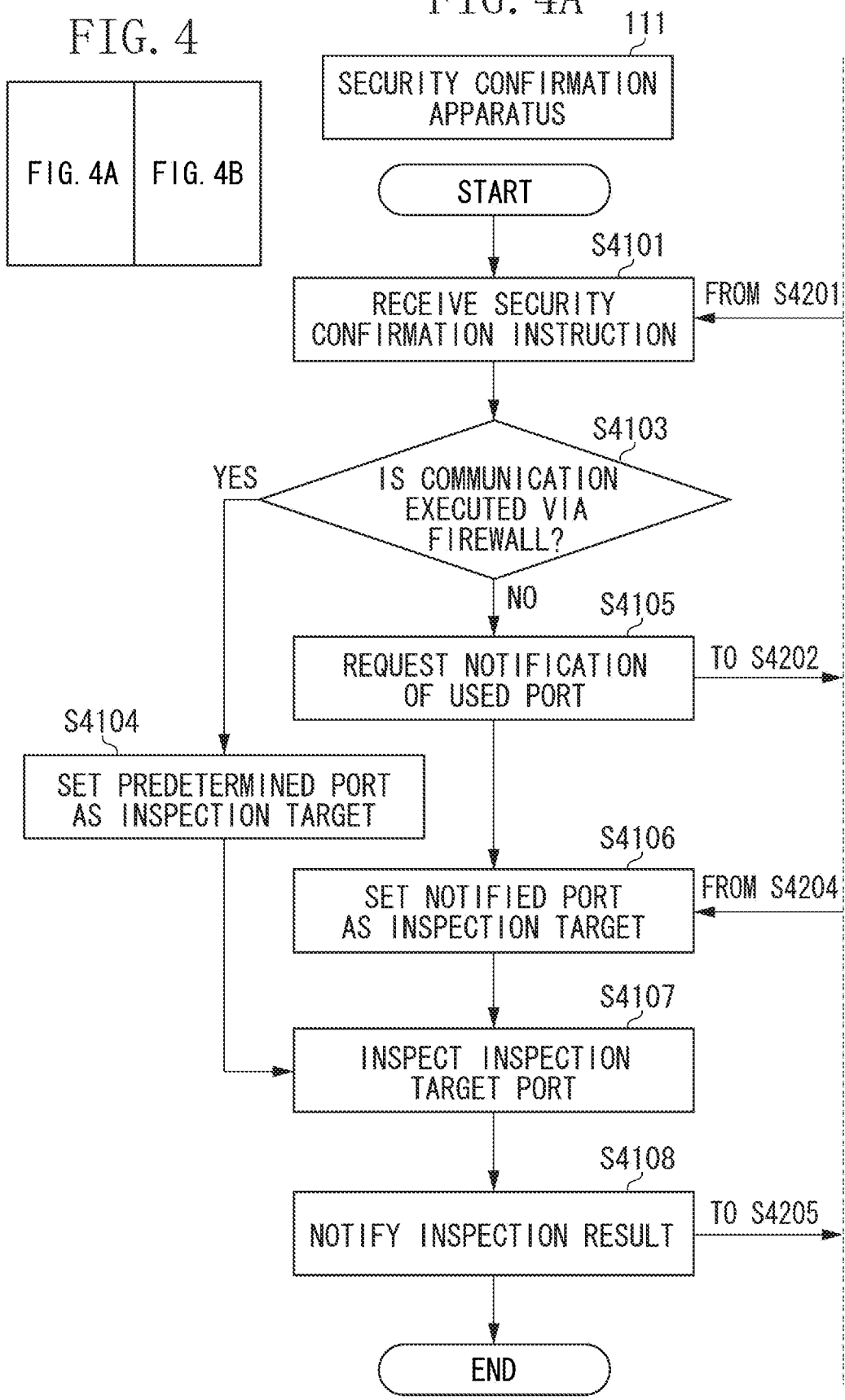

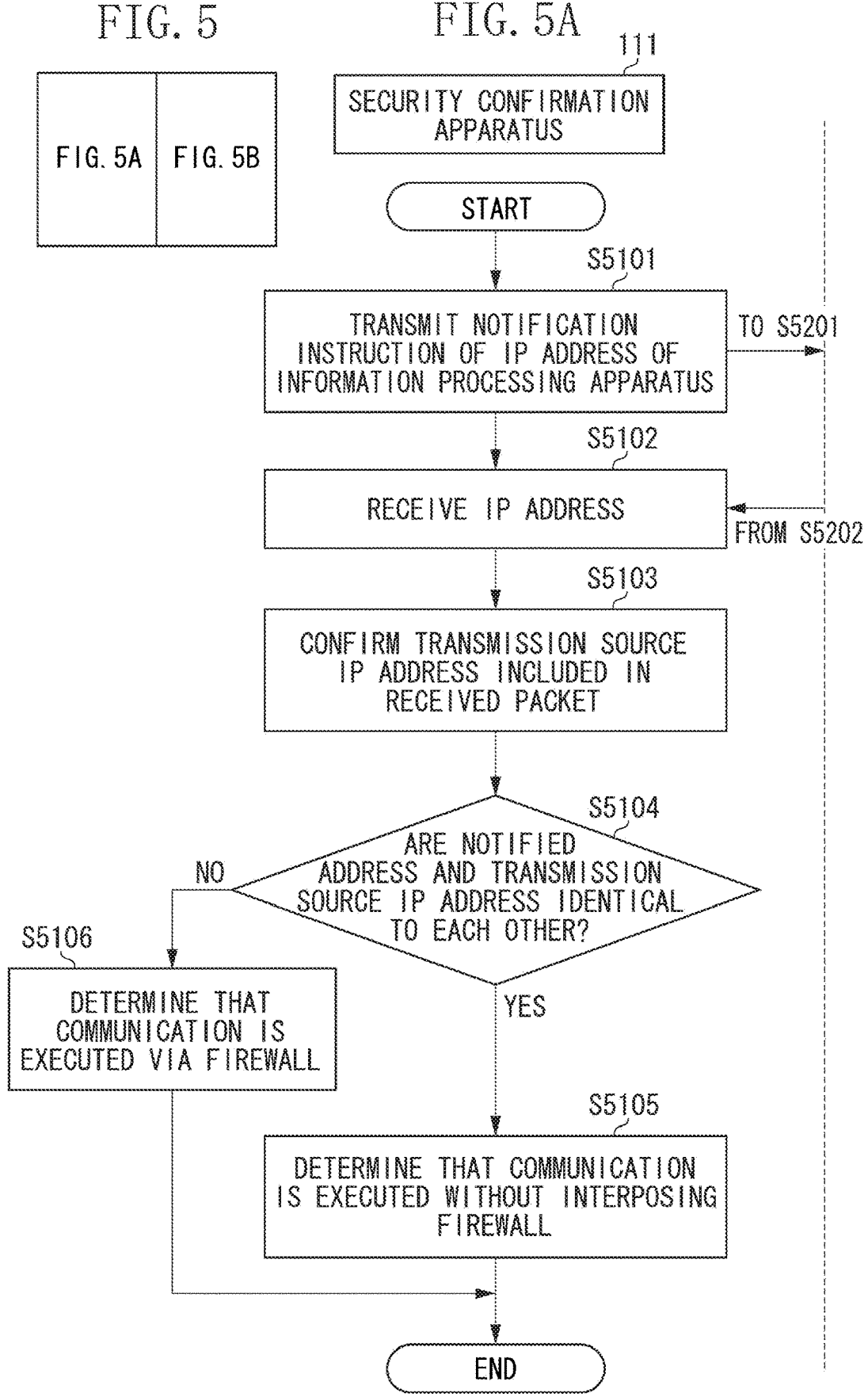

SECURITY CONFIRMATION APPARATUS, SYSTEM, INFORMATION PROCESSING METHOD, AND STORAGE MEDIUM

BACKGROUND

Field of Art

The present disclosure relates to a security confirmation apparatus, a system, an information processing method, and a storage medium.

Description of the Related Art

In recent years, various types of apparatuses have come to be connected to a network, and services using network communication are provided. For example, there is provided a system in which a management server installed in a service center manages state information of a multifunction peripheral connected thereto via a network, so as to allow the service center to provide appropriate maintenance services according to a state of the multifunction peripheral.

On the other hand, because an apparatus is connected to the network, a risk in terms of security (e.g., unintentional access from an external apparatus to the information retained in the apparatus) has been increasing.

Conventionally, as a technique for preventing the above-described unintentional access from the external apparatus, Japanese Patent Application Laid-Open No. 2007-272396 discusses a technique for providing a firewall between the apparatus and the network.

Further, Japanese Patent Application Laid-Open No. 2005-25269 discusses a technique which enables an external apparatus to detect a security hole of a target apparatus through port scanning to prompt the target apparatus to take security measures.

Since the apparatus that has not been conventionally connected to the network is now connected to the network, there is an increasing number of cases where the apparatus is connected to the network without taking sufficient security measures. For example, there is a case where a user connects the apparatus to the internet to use a network service without interposing a firewall.

As a method of externally confirming whether sufficient security measures are taken by the apparatus, it is effective to execute the port scanning as described in Japanese Patent Application Laid-Open. No. 2005-25269.

However, in the conventional port scanning method, port scanning has been executed regardless of whether an information processing apparatus executes communication via a firewall or without interposing a firewall.

In the case of the information processing apparatus that executes communication without interposing a firewall, it will take extremely long time to execute inspection if all of the ports (i.e., 65535 ports) are inspected regardless of whether the ports are used. On the other hand, with an inspection method in which an inspection is executed for reduced number of ports, only an inspection that leaves a user a sense of insecurity can be executed.

SUMMARY

According to an aspect of a present embodiment, a confirmation apparatus includes a memory device that stores a set of instructions, and at least one processor that executes the set of instructions to determine whether an information processing apparatus that has transmitted a security confirmation instruction executes communication via a firewall, set predetermined ports as inspection targets in a first case where it is determined that the information processing apparatus executes communication via the firewall, set ports listed in a used port list received from the information processing apparatus as the inspection targets in a second case where it is determined that the information processing apparatus executes communication without interposing the firewall, inspect ports set as the inspection targets, and notify the information processing apparatus of an inspection result.

Features of the present invention will become apparent from the following description of exemplary embodiments with reference to the attached drawings.

DESCRIPTION OF THE EMBODIMENTS

Hereinafter, an exemplary embodiment will be described with reference to the appended drawings.

Figure 1:
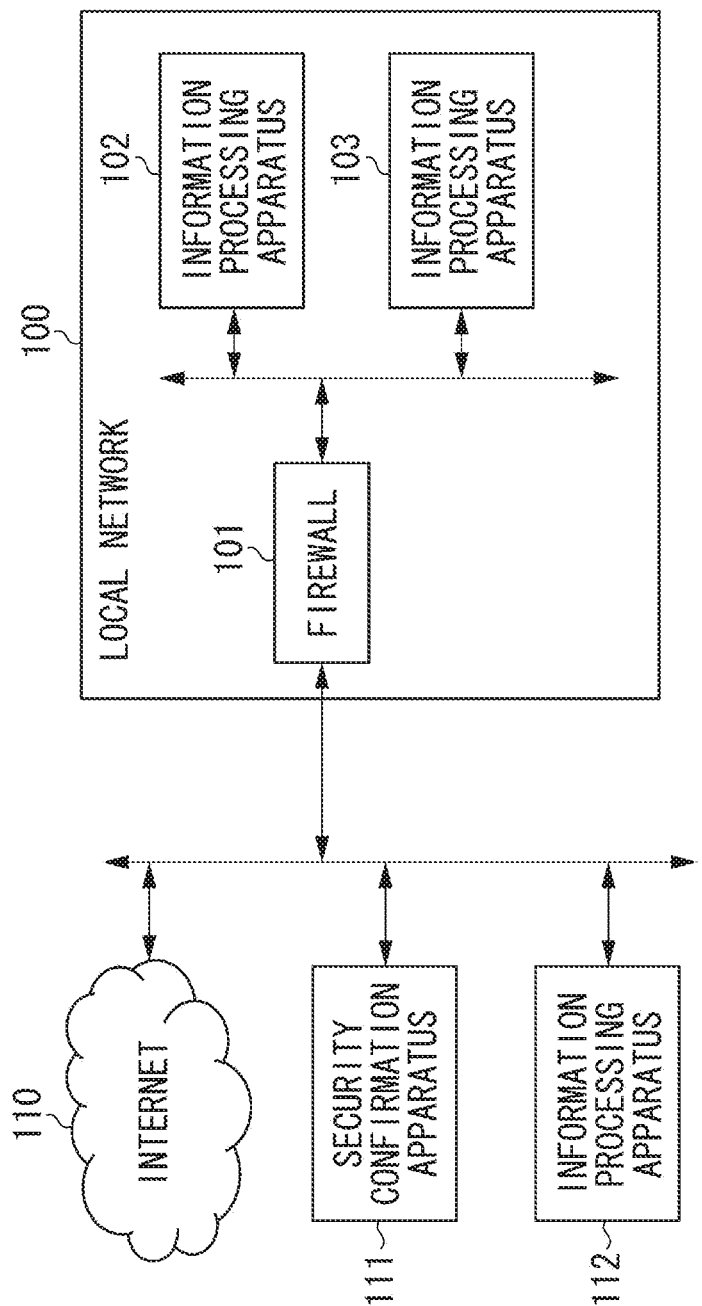
FIG. 1 is a block diagram illustrating an example of a system configuration of an information processing system.

FIG. 1 is a block diagram illustrating an example of a system configuration of an information processing system. The information processing system includes a plurality of information processing apparatuses 102 and 103 and a firewall 101 that relays the entire external network communication executed by the information processing apparatuses 102 and 103. Further, the information processing system includes a security confirmation apparatus 111 and an information processing apparatus 112 capable of communicating with an internet 110 without interposing the firewall 101.

Although two information processing apparatuses that communicate with the internet 110 via the firewall 101 are described in a first exemplary embodiment, the number of information processing apparatuses that communicate with the internet 110 via the firewall 101 may be one, or may be three or more. Further, although one information processing apparatus that communicates with the internet 110 without interposing the firewall 101 is described, the number thereof may be more than one.

Figure 2:
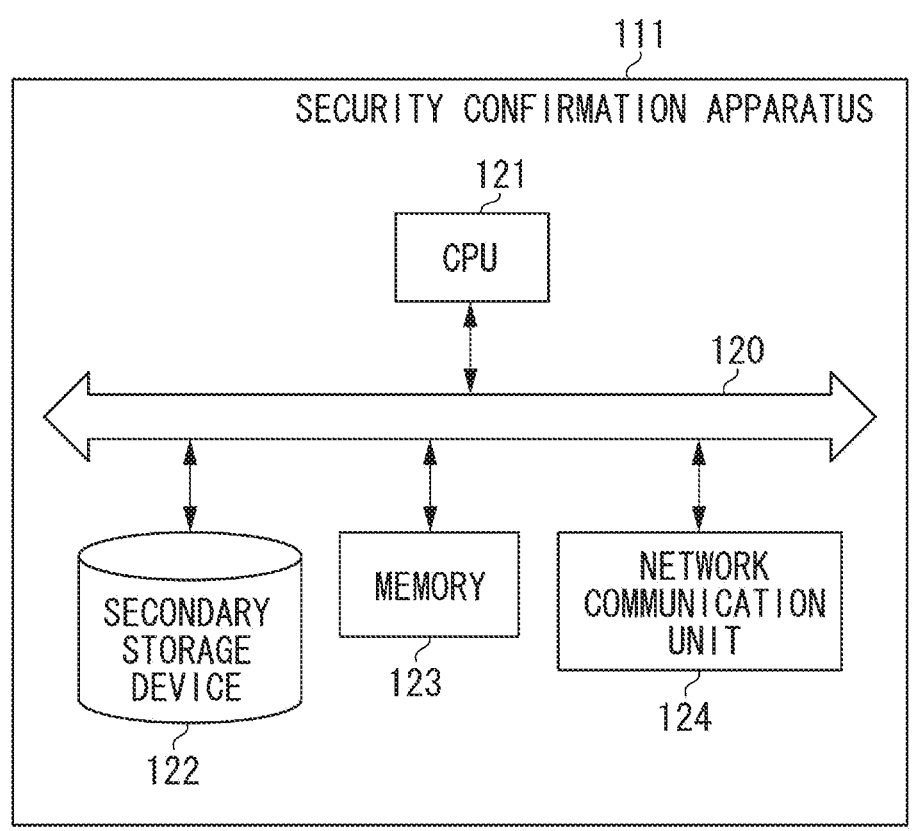
FIG. 2 is a block diagram illustrating an example of a hardware configuration of a security confirmation apparatus.

FIG. 2 is a block diagram illustrating an example of a hardware configuration of the security confirmation apparatus 111. A memory 123 functions as a main memory or a work area of a central processing unit (CPU) 121 as well as being used as a buffer area for security confirmation operation. The memory 123 and other components which store information for the security confirmation apparatus 111 may also be described as confirmation memory. The CPU 121 and one or more other processors that execute instructions for the security confirmation apparatus 111 may also be described as a confirmation processor. A secondary storage device 122 stores a program of an operating system and a control program of the security confirmation apparatus 111. Further, the secondary storage device 122 is used as an area for temporarily saving data when the memory 123 is not sufficient. A network communication unit 124 executes communication control when the security confirmation apparatus 111 communicates with another information processing apparatus via a network.

The CPU 121 executes processing based on the program stored in the secondary storage device 122, so as to realize a function of the security confirmation apparatus 111 and below-described processing executed by the security confirmation apparatus 111 illustrated in the flowcharts in FIGS. 4 and 5.

Figure 3:
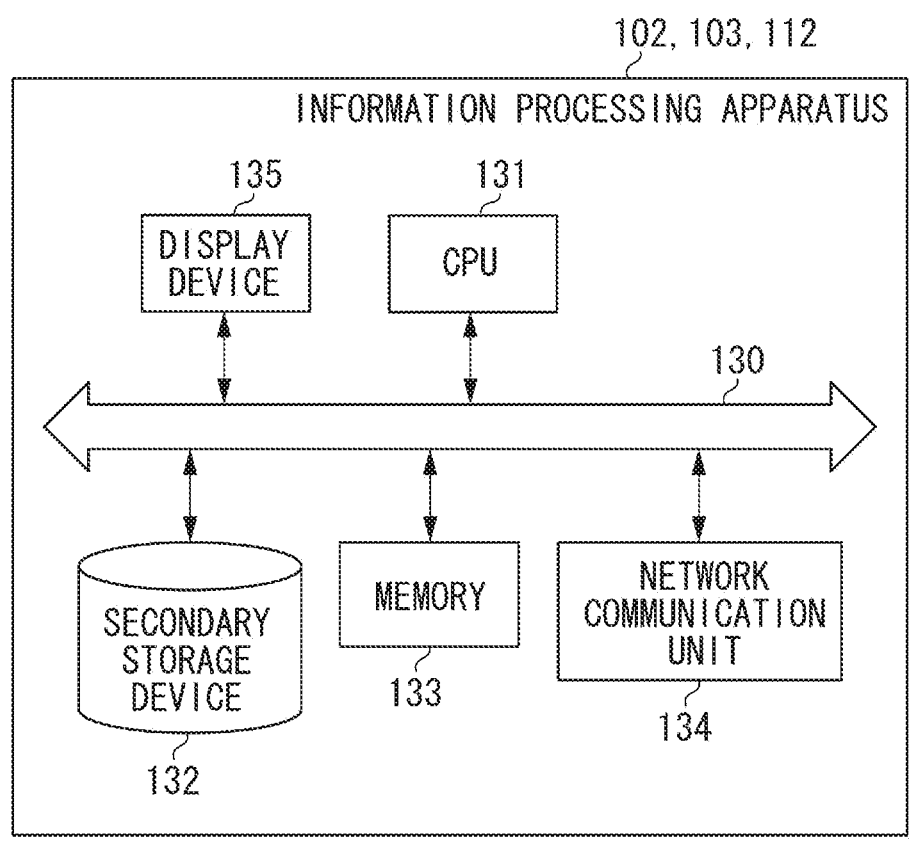
FIG. 3 is a block diagram illustrating an example of a hardware configuration of an information processing apparatus.

FIG. 3 is a block diagram illustrating an example of a hardware configuration of the information processing apparatus 102, 103, and 112. A memory 133 functions as a main memory or a work area of a CPU 131 as well as being used as a buffer area for security confirmation operation. The memory 133 and other components which store information for the information processing apparatuses may also be described to as information memory. The information memory and the confirmation memory may be substantially the same and just located in different apparatuses. The CPU 131 and one or more other processors that execute instructions for the information processing apparatuses may also be described as an information processor. The information processor and the confirmation processor may be substantially the same and just located in different apparatuses. A secondary storage device 132 stores a program of an operating system and a control program main body of the information processing apparatus. Further, the secondary storage device 132 is used as an area for temporarily saving data when the memory 133 is not sufficient. A network communication unit 134 executes communication control when the information processing apparatus communicates with another information processing apparatus via a network.

The CPU 131 executes processing based on the program stored in the secondary storage device 132, so as to realize a function of the information processing apparatus and below-described processing executed by the information processing apparatus illustrated in the flowcharts in FIGS. 4 and 5.

Figure 4B:
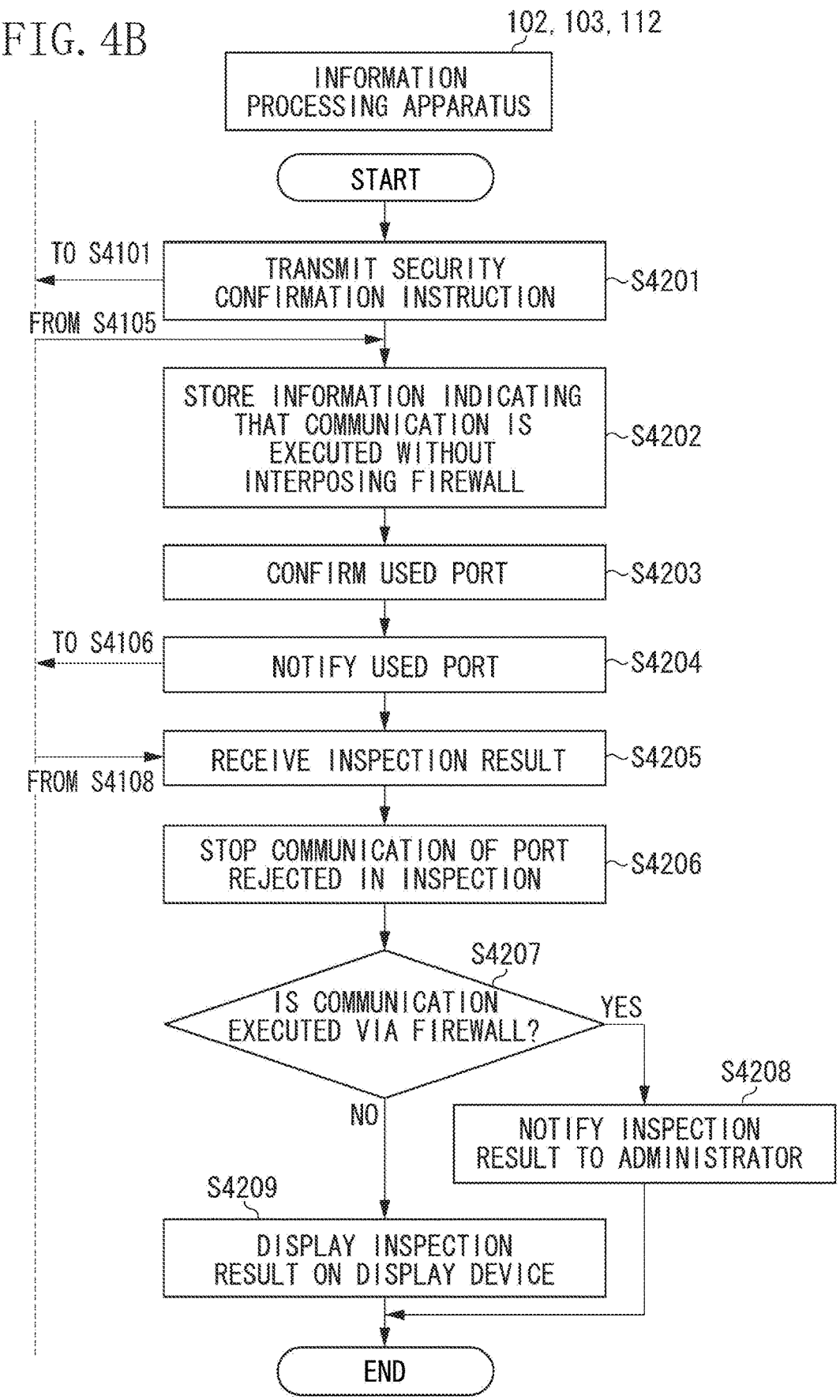
FIG. 4 (consisting of FIGS. 4A and 4B) is a flowchart illustrating an example of information processing executed by the information processing system.

FIG. 4 is a flowchart illustrating an example of information processing executed by the information processing system. Hereinafter, unless otherwise specified, in order to simplify the description, of the information processing apparatuses 102, 103, and 112, the information processing apparatus 112 is assumed to transmit a security confirmation instruction to the security confirmation apparatus 111. For example, the information processing apparatus 102, 103, or 112 periodically transmits a security confirmation instruction to the security confirmation apparatus 111 based on user operation performed through a display device 135 or based on a preset time schedule. Further, the information processing apparatus 102, 103, or 112 periodically transmits maintenance information to the security confirmation apparatus 111. For example, the information processing apparatus 102, 103, or 112 may transmit the security confirmation instruction to the security confirmation apparatus 111 together with the maintenance information.

In step S4201, the CPU 131 of the information processing apparatus 112 (hereinafter, simply referred to as "CPU 131" in FIGS. 4 and 5) transmits a security confirmation instruction to the security confirmation apparatus 111. In step S4101, the CPU 121 receives the security confirmation instruction. In step S4103, the CPU 121 determines whether communication is executed via the firewall 101. If the CPU 121 determines that communication is executed via the firewall 101 (YES in step S4103), the processing proceeds to step S4104. If the CPU 121 determines that communication is executed without interposing the firewall 101 (NO in step S4103), the processing proceeds to step S4105. Details of the processing in step S4103 will be described below with reference to FIG. 5. In step S4105, the CPU 121 transmits a transmission request for a used port list to the information processing apparatus 112 that has transmitted the security confirmation instruction. In step S4202, the CPU 131 receives the transmission request for the used port list and stores, in the secondary storage device 132, information indicating that communication with the security confirmation apparatus 111 is executed without interposing the firewall 101. In step S4203, based on the received transmission request for the used port list, the CPU 131 identifies network ports used by the CPU 131 itself as used ports and creates a used port list. In step S4204, the CPU 131 notifies the used port list to the security confirmation apparatus 111. In step S4106, the CPU 121 sets the ports listed in the received used port list as inspection target ports. The processing in steps S4105 and S4106 is an example of processing executed for acquisition of the used port list. On the other hand, in step S4104, the CPU 121 sets predetermined ports as the inspection targets. For example, the predetermined ports are well-known ports of No. 0 to 1023. The well-known ports are ports that are typically used by system processes that provide commonly used network services. In step S4107, the CPU 121 inspects all of t e ports set as the inspection targets. In step S4108, the CPU 121 notifies the inspection result to the information processing apparatus 112 that had transmitted the security confirmation instruction. In step S4205, the CPU 131 receives the inspection result. In step S4206, based on the received inspection result, the CPU 131 stops network communication of a port rejected in the inspection if there is any port rejected in the inspection. In step S4207, the CPU 131 determines whether communication with the security confirmation apparatus 111 is executed via the firewall 101. If the CPU 131 determines that communication with the security confirmation apparatus 111 is executed via the firewall 101 (YES in step S4207), the processing proceeds to step S4208. On the other hand, if the CPU 131 determines that communication with the security confirmation apparatus 111 is executed without interposing the firewall 101 (NO in step S4207), the processing proceeds to step S4209. If a port rejected in the inspection exists, in step S4208, the CPU 131 notifies the inspection result to a network administrator because there is a problem the setting of the firewall 101. In addition, even if the port rejected in the inspection does not exist, the CPU 131 may notify the inspection result to the network administrator. Further, the CPU 131 may display the inspection result on the display device 135 in addition to notifying the inspection result to the network administrator. In step S4209, the CPU 131 displays the inspection result received in step S4205 or information about the port stopped in step S4206 on the display device 135. The processing in steps S4208 and S4209 is an example of inspection result output processing.

Figure 5B:
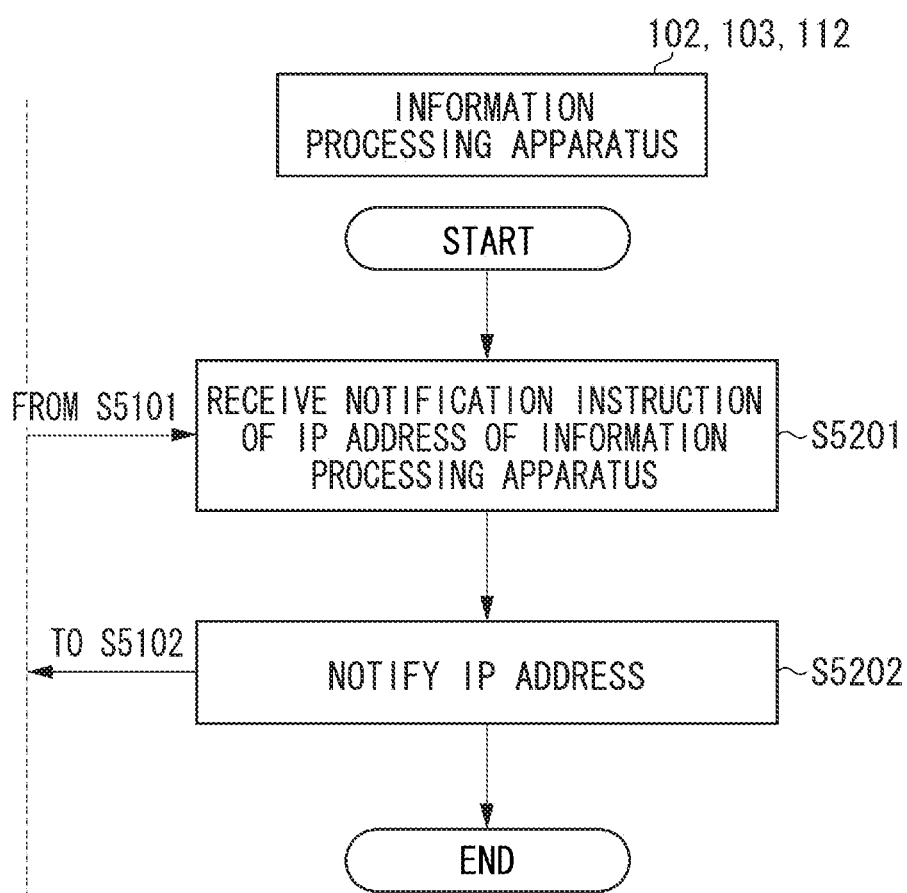
FIG. 5 (consisting of FIGS. 5A and 5B) is a flowchart illustrating an example of processing in step S4103 of FIG. 4.

FIG. 5 is a flowchart illustrating an example of processing executed in step S4103 of FIG. 4.

In step S5101, the CPU 121 transmits a notification instruction of internet protocol (IP) address of the information processing apparatus 112 thereto that has transmitted the security confirmation instruction. In step S5201, the CPU 131 receives the notification instruction of IP address of the information processing apparatus 112 from the security confirmation apparatus 111. In step S5202, the CPU 131 transmits the IP address of the information processing apparatus 112 to the security confirmation apparatus 111. In step S5102, the CPU 121 receives the IP address (notified address) transmitted from the information processing apparatus 112. The IP address received in step S5102 is an example of apparatus identification information. In step S5103, the CPU 121 confirms a transmission source IP address included in a received packet at the time of receiving the IP address. The transmission source IP address included in the received packet is an example of transmission source identification information. In step S5104, the CPU 121 compares the notified address and the transmission source IP address included in the received packet. As a result of the comparison, if the CPU 121 determines that the IP addresses are identical to each other (YES in step S5104), the processing proceeds to step S5105. If the CPU 121 determines that the IP addresses are not identical to each other (NO in step S5104), the processing proceeds to step S5106. In step S5105, the CPU 121 determines that communication is executed without interposing the firewall 101. On the other hand, in step S5106, the CPU 121 determines that communication is executed via the firewall 101.

Through the above-described configuration, the inspection of appropriate ports can be executed according to whether the information processing apparatus executes communication via the firewall, so that the time taken for the inspection can be reduced and the security thereof can be ensured.

Further, in the processing illustrated in FIG. 4, although communication of the port rejected in the inspection is stopped instantly, depending on the setting, the information processing apparatus may only notify the administrator or the user without stopping the communication.

Although the exemplary embodiments according to the present invention have been described as the above, the present invention is not limited to the above-described exemplary embodiments.

As described above, through the processing described in the above-described exemplary embodiments, time taken for the inspection can be reduced and the security can be ensured. Further, the information processing apparatus can periodically check the security by periodically transmitting the security confirmation instruction to the security confirmation apparatus, and the security level thereof can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions one or more the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-125798, filed Jun. 24, 2016, which is hereby incorporated by reference herein in its entirety.

What is claimed is:

1. A confirmation apparatus being able to communicate with one or more first information processing apparatuses via a firewall and one or more second information processing apparatuses not via a firewall comprising:
  a memory device that stores a set of instructions; and
  one or more processors that execute the set of instructions to:
    request an information processing apparatus that has transmitted a security confirmation instruction to transmit an internet protocol (IP) address;
    determine whether the IP address of the information processing apparatus received in response to the request matches an IP address set in a received packet corresponding to the security confirmation instruction;
    determine whether the information processing apparatus received in response to the request executes communication via the firewall;
    set well-known ports as inspection targets from among a plurality of ports of a first information processing apparatus which is the information processing apparatus of which the IP address is determined to match the IP address set in the received packet and which is determined to execute communication via the firewall;
    from among a plurality of ports of a second information processing apparatus which is the information processing apparatus of which the IP address is determined not to match the IP address set in the received packet and which is determined to execute communication not via the firewall, acquire a used port list and set ports listed in the used port list as inspection targets; and
    inspect ports set as the inspection targets.

2. The confirmation apparatus according to claim 1, wherein the at least one processor executes instructions in the memory device to:
  determine whether the information processing apparatus executes communication via the firewall based on apparatus identification information received from the information processing apparatus and transmission source identification information included in a received packet at a time of receiving the apparatus identification information.

3. The confirmation apparatus according to claim 2, wherein the at least one processor executes instructions in the memory device to:

determine that the information processing apparatus executes communication without interposing the firewall in a third case where the apparatus identification information received from the information processing apparatus and the transmission source identification information included in the received packet at the time of receiving the apparatus identification information are identical to each other; and determine that the information processing apparatus executes communication via the firewall in a case fourth where the apparatus identification information received from the information processing apparatus and the transmission source identification information included in the received packet at the time of receiving the apparatus identification information are not identical to each other.

4. The confirmation apparatus according to claim 1, wherein the well-known ports are predetermined ports.

5. A system including a confirmation apparatus and a plurality of information processing apparatuses, the confirmation apparatus being able to communicate with one or more first information processing apparatuses of the plurality of information processing apparatuses via a firewall and one or more second information processing apparatuses of the plurality of information processing apparatuses not via a firewall, the confirmation apparatus comprising:
  a confirmation memory device that stores a set of confirmation instructions; and one or more processors that execute the set of confirmation instructions to: request an information processing apparatus that has transmitted a security confirmation instruction to transmit an internet protocol (IP) address;
  determine whether the IP address of the information processing apparatus received in response to the request matches an IP address set in a received packet corresponding to the security confirmation instruction;
  determine whether the information processing apparatus received in response to the request executes communication via the firewall;
  set well-known ports as inspection targets from among a plurality of ports of a first information processing apparatus which is the information processing apparatus of which the IP address is determined to match the IP address set in the received packet and which is determined to execute communication via the firewall;
  from among a plurality of ports of a second information processing apparatus which is the information processing apparatus of which the IP address is determined not to match the IP address set in the received packet and which is determined to execute communication not via the firewall, acquire a used port list and set ports listed in the used port list as inspection targets; and
  inspect ports set as the inspection targets;
each of the plurality of information apparatuses comprising:
  an information memory device that stores a set of information instructions; and
  at least one information processor that executes the set of information instructions to transmit a security confirmation instruction to the confirmation apparatus.

6. The system according to claim 5, wherein the at least one information processor of each of the plurality of information processing apparatuses executes information instructions in the information memory device of each information processing apparatus to:
  stop communication via a rejected port, wherein the rejected port is rejected based on being listed as rejected in an inspection result of the confirmation apparatus.

7. The system according to claim 5, wherein the at least one information processor of each of the plurality of information processing apparatuses executes instructions in the information memory device of each information processing apparatus to:
  periodically transmit the security confirmation instruction to the confirmation apparatus.

8. An information processing method executed by a confirmation apparatus, the confirmation apparatus being able to communicate with one or more first information processing apparatuses via a firewall and one or more second information processing apparatuses not via a firewall, comprising:
  requesting an information processing apparatus that has transmitted a security confirmation instruction to transmit an internet protocol (IP) address;
  determining whether the IP address of the information processing apparatus received in response to the request matches an IP address set in a received packet corresponding to the security confirmation instruction;
  determining whether the information processing apparatus received in response to the request executes communication via the firewall;
  setting well-known ports as inspection targets from among a plurality of ports of a first information processing apparatus which is the information processing apparatus of which the IP address is determined to match the IP address set in the received packet and which is determined to execute communication via the firewall;
  from among a plurality of ports of a second information processing apparatus which is the information processing apparatus of which the IP address is determined not to match the IP address set in the received packet and which is determined to execute communication not via the firewall, acquiring a used port list and setting ports listed in the used port list as inspection targets; and
  inspecting ports set as the inspection targets.

9. A non-transitory computer readable storage medium storing a program for causing a processor to execute a method of controlling a confirmation apparatus, the confirmation apparatus being able to communicate with one or more first information processing apparatuses via a firewall and one or more second information processing apparatuses not via a firewall, the method comprising:
  requesting an information processing apparatus that has transmitted a security confirmation instruction to transmit an internet protocol (IP) address;
  determining whether the IP address of the information processing apparatus received in response to the request matches an IP address set in a received packet corresponding to the security confirmation instruction;
  determining whether the information processing apparatus received in response to the request executes communication via the firewall;
  setting well-known ports as inspection targets from among a plurality of ports of a first information processing apparatus which is the information processing apparatus of which the IP address is determined to match the IP address set in the received packet and which is determined to execute communication via the firewall;

from among a plurality of ports of a second information processing apparatus which is the information processing apparatus of which the IP address is determined not to match the IP address set in the received packet and which is determined to execute communication not via the firewall, acquiring a used port list and setting ports listed in the used port list as inspection targets; and inspecting ports set as the inspection targets.

\* \* \* \* \*